United States Patent [19]
Bonney

[11] Patent Number: 5,313,801
[45] Date of Patent: May 24, 1994

[54] CRYOSTAT THROTTLE

[75] Inventor: Glenn Bonney, Macungie, Pa.

[73] Assignee: APD Cryogenics, Inc., Allentown, Pa.

[21] Appl. No.: 909,777

[22] Filed: Jul. 7, 1992

[51] Int. Cl.⁵ ............................................. F25B 19/02
[52] U.S. Cl. ............................................. 62/51.2
[58] Field of Search ............................................. 62/51.2

[56] References Cited

U.S. PATENT DOCUMENTS

| | | | |
|---|---|---|---|
| 3,320,755 | 5/1967 | Jepson et al. | 62/51.2 |
| 3,728,868 | 4/1973 | Longsworth | 62/51.2 |
| 4,002,039 | 1/1977 | Cramer et al. | 62/51.2 |
| 4,152,903 | 5/1979 | Longsworth | 62/51.2 |
| 4,177,650 | 12/1979 | Campbell | 62/51.2 |
| 4,781,033 | 11/1988 | Steyert et al. | 62/51.2 |

Primary Examiner—Ronald C. Capossela
Attorney, Agent, or Firm—Helfgott & Karas

[57] ABSTRACT

The throttling sensitivity of a demand flow cryostat may be controlled and stabilized by selectively exposing refrigerant to the surface of a sensor which actuates a refrigerant throttle valve. The sensor is formed of a plastic material such as high density polyethylene which has a high coefficient of thermal contraction.

19 Claims, 6 Drawing Sheets

CRYOSTAT THROTTLE

BACKGROUND OF THE INVENTION

1. Field of the Invention

The present invention is generally concerned with a variable flow cryostat and is particularly concerned with a cryostat having a plastic sensor which maintains a stable refrigerant flow rate over a wide range of operating conditions and which may be selectively exposed to fluid refrigerant for controlling the throttling sensitivity of the cryostat.

1. Description of Prior Developments

Cryostats have been frequently used to maintain a particular cold operating temperature within an enclosure such as a dewar flask by controlling the release of a refrigerant into the enclosure. A demand flow cryostat, which varies the release of fluid refrigerant based on the heat load and operating temperature in the enclosure, typically includes a refrigerant supply connection in the form of an inlet tube, a heat exchanger such as a finned coiled tube, and a temperature-controlled variable flow nozzle or orifice.

The refrigerant is usually supplied to the cryostat as a high pressure gas at the local ambient temperature. Initially, the cryostat itself is also typically at the same local ambient temperature. The high pressure refrigerant gas flows through the inlet tube to the cryostat and then through the inside of the heat exchanger tube.

The heat exchanger tube generally has an external extended surface, such as fins, to carry the heat radially away from the inside surface of the tube. The high pressure gas then exits through the orifice of the variable flow nozzle and flows into a lower pressure area contained by the dewar. The lower pressure generally coincides with the local ambient pressure.

The pressure drop in the gas flowing through the orifice occurs supersonically and isenthalpically so that the gas experiences a temperature reduction relative to its pressure reduction and in accordance with the well known Joule-Thomson principle. The lower pressure and now lower temperature gas, which is contained by the dewar, is forced to flow over the external extended surface on the heat exchanger. This colder exhaust gas flow is counter to the direction of the warmer incoming gas flow so that heat is exchanged.

The warmer higher pressure incoming gas is cooled while the colder lower pressure exhaust gas is warmed. The exhaust gas flows toward the warm end exit of the heat exchanger and into the local ambient region. Eventually, as flow continues at an appropriate rate, the high pressure gas that exits through the orifice is pre-cooled enough during its flow through the heat exchanger to form vapor and liquid at the lower pressure.

This process continues during the cooldown period until an equilibrium is established. The heat from the cryostat, sensor assembly, and dewar must be removed before equilibrium or steady-state operation is achieved. Throttling occurs usually prior to such equilibrium.

The cold low pressure liquid refrigerant that is created during expansion through the orifice is contained by the dewar at the cold end of the cryostat. The cold, turbulent, low pressure liquid absorbs heat depending on the heat source and load. This causes the liquid to boil, vaporize and then convert into gas again as it continues to absorb heat while flowing along the heat exchanger toward the warm end exit. This process continues until the supply of high pressure gas is shut off at the inlet to the cryostat.

When inserted into a dewar flask, and operating on the Joule-Thomson principle to provide refrigeration, the demand flow cryostat throttles the flow of refrigerant through the variable flow nozzle. This throttling will occur during or after the cooldown of the cryostat and dewar flask in order to reduce the rate of refrigerant consumption. After the cooldown, the flow of refrigerant is regulated to maintain a stable cold operating temperature in the dewar flask. The throttling rate and flow regulation are generally dependent upon changes in various parameters which govern the action of the temperature-controlled variable flow nozzle.

The fluid refrigerant, typically a pressurized gas or liquid, may include a single component or multiple components. In any case, the cryostat will provide a unique cold temperature at its nominal operating condition and it will have a unique heat exchanger temperature gradient along its length from the warmer ambient temperature end to the colder refrigerated end. The colder end of the cryostat is that end through which the refrigerant issues from the variable flow nozzle.

The heat exchanger temperature gradient is the temperature profile which is established lengthwise and widthwise along the heat exchanger during and after cooldown. The temperature gradient is primarily a function of the refrigerant being used, its supply ambient temperature and pressure, the flow rate, and the heat load applied to the cryostat from the dewar. The temperature at a given position in the heat exchanger is established by its operating with influence from such variables.

Various refrigerant throttling mechanisms of the type adaptable for use with cryostats include bi-metallic mechanisms, gas-charged bellows mechanisms, and bi-material mechanisms. Such devices are, for example, disclosed in U.S. Pat. No. 3,320,755, 3,728,868, and 4,152,903. These throttle mechanisms are typically adjusted to respond in correlation with the temperature of the refrigerant at the cold end of the cryostat or with the heat exchanger temperature gradient which results from the refrigeration process during or after cooldown. These throttle mechanisms can also be adjusted to provide a desired flow rate after cooldown.

The heat that is transferred from the throttle mechanism to the colder refrigerant and heat exchanger causes the throttle mechanism to either expand or contract. This temperature-induced throttle movement is employed to operate a valve or nozzle to reduce or throttle the flow of refrigerant as the temperature surrounding the throttle mechanism approaches a desired operating temperature. After achieving the desired operating temperature, the same temperature sensitive movement is employed to regulate the flow of refrigerant in order to stabilize the operating temperature under conditions of varying refrigerant supply pressure and temperature.

A problem associated with conventional throttle mechanisms is their high sensitivity to temperature gradients. Their tendency is to throttle differently with different refrigerants having different cold end temperatures or causing different heat exchanger temperature gradients. This high sensitivity makes the throttling or regulation of refrigerant flow difficult to control.

Depending on the type of throttle mechanism, its adjusted and set parameters, and the cryostat's operating condition, the refrigerant flow may be unpredictably throttled. That is, throttling may occur either prematurely or incompletely when a refrigerant, having either a warmer or colder cold end temperature or heat exchanger temperature gradient compared to another refrigerant, is supplied to the cryostat. This can lead to unpredictable or undesirable cooldown or post-cooldown operation.

Accordingly, a need exists for a mechanism to control the throttle sensitivity of a temperature-controlled variable flow nozzle of a demand flow cryostat so that the cryostat may be operated reliably with different refrigerants or with different heat exchanger temperature gradients over a wide range of operating conditions.

A further need exists for a method of controlling the thermal resistance and the heat transfer between the throttle mechanism and the refrigerant.

Still another need exists for a cryostat which may be designed with a compact profile for use in applications where space is limited and/or weight is to be minimized.

Yet another need exists for a cryostat which may provide selective or variable access to a throttle mechanism by the cryostat refrigerant.

SUMMARY OF THE INVENTION

The present invention has been developed to fulfill the needs noted above and therefore has as an object the provision of a variable flow cryostat having one or more openings of controlled size and shape located in the body structure of the cryostat. These openings form refrigerant access ports which expose or restrict exposure of a throttle mechanism to the refrigerant and/or to the cold end of the cryostat heat exchanger.

The construction of the cryostat body typically requires a supporting structure in the form of a tube or mandrel for supporting a heat exchanger. The support structure also supports at least a portion of the throttle mechanism.

When the supporting structure of the cryostat is interposed between the throttle mechanism and the cold refrigerant or heat exchanger, the throttle sensitivity to different refrigerants may be varied and controlled. This controlled throttle sensitivity may be achieved by forming one or more openings through the heat exchanger or throttle mechanism support structure to allow for a controlled, predetermined direct exposure of the throttle mechanism to the refrigerant which has exited the variable flow nozzle.

The actuation of the throttle mechanism may be controlled by the thermal expansion and contraction of a plastic sensor. This expansion and contraction may be modified by controlling the exposure of refrigerant to the sensor by presetting or controlling the sizing and location of various refrigerant control openings or access ports.

The throttle control opening or openings can be any size as in cross-sectional area and any shape, although round holes are typical. These openings can be provided in virtually any quantity up to that limited by the minimum strength and size of the supporting structure. The location of these openings can be in the bottom and/or in the sides of the heat exchanger support mandrel, such as in the nozzle seat and/or in the heat exchanger mandrel. The openings can also be placed simultaneously in both locations.

If the opening or openings are located along the side of the heat exchanger support mandrel, they will expose the throttle mechanism sensor to the heat exchanger that is positioned on the outside of that area of the support mandrel. The opening or openings will also allow the cold low pressure exhaust gas which is flowing along the heat exchanger in that same area to be exposed to the sensor.

In this manner, the temperature that the sensor responds to will be a function of both the heat exchanger temperature and the cold gas in that same location. This is in contrast to having openings in only the nozzle seat which would expose the sensor to only the cold low pressure gas, vapor and/or liquid contained by the dewar at the cold end of the cryostat.

A further object of the invention is to use a plastic sensor, preferably formed of a polyethylene material, to throttle, via thermal expansion and contraction, a refrigerant through a Joule-Thomson expansion orifice. Because polyethylene has a greater coefficient of thermal expansion than those plastic materials used in prior cryostat bi-material throttle mechanisms, the effective length of a cryostat according to the present invention may be minimized. Moreover, the thermal mass of the bi-material throttle mechanism may be correspondingly reduced. This allows for a compact cryostat construction.

Another object of the invention is to mount a throttle mechanism at a predetermined fixed position within a heat exchanger support mandrel. In this manner, the throttle mechanism always remains fixed to the same heat exchanger mandrel location and thereby follows the thermally-induced movements of the mandrel. Such a mounting arrangement reduces the amount of plastic sensor contraction required for throttling as compared to those prior designs which mounted the plastic sensor to a separate tube concentrically disposed within the support mandrel.

Still another object of the invention is to prevent the waste of cryostat refrigerant by maintaining a stable refrigerant flow with a bi-material throttle mechanism which uses a throttle mechanism sensor formed from a plastic material, such as polyethylene, which does not react rapidly to temperature or refrigerant flow fluctuations.

Yet another object of the invention is to provide a cryostat which is virtually insensitive to wide changes in the inlet refrigerant temperature. This is achieved by adjusting the bi-material throttle mechanism, which is actuated by the plastic sensor, such that the throttle is open over a temperature range of, for example, 240° K. to 100° K. In this case, after an initial release of refrigerant to effect a cooldown to 100° K., the variable flow nozzle will not again fully open to release refrigerant until the temperature around the throttle mechanism returns to 240° K.

The sensor has been designed to contract fully when cooled from an initial ambient temperature of about 240° K. to a temperature of about 100° K. A temperature of about 240° K. represents the typical cold condition for military equipment designs while 100° K. represents the upper end of normal boiling point temperatures for the typical gases used as Joule-Thomson refrigerants. The 240° K. to 100° K. region has been selected for general purpose applications although the sensor design can be tailored for specific applications having full contraction over different temperature regions.

When the sensor assembly is located near the colder end of the heat exchanger assembly as compared with the warmer end, the sensor will be more completely cooled and contract fully. If the same length of sensor is located in a warmer region of the heat exchanger assembly, it will contract less because of its exposure to less of an overall temperature change.

When the sensor assembly extends along the full length of the heat exchanger, or if it is exposed to a temperature gradient along its length such that one end is warmer than the other, the sensor will be partially cooled and contract less. In order to achieve the same throttled flow rate with a sensor located in a warmer region or with a full length sensor, as compared to that of a sensor located in a colder region or with a shorter length sensor, either the variable flow nozzle open position must be reduced in the initial unthrottled condition, or the sensor length must be increased to provide more contraction over the available temperature change.

Still another object of the invention is to place a plastic sensor in close communication with the cold end of the cryostat and to expose the sensor to the cold end temperature of the cryostat and to the refrigerant at the cold end of the cryostat. This arrangement maximizes the amount of thermal contraction of the sensor and thereby minimizes its required effective length. Moreover, this arrangement reduces the affect of warm end heating of the sensor from the ambient, improves the flow regulation of refrigerant, and minimizes the thermal mass of the higher heat capacity plastic sensor material.

Since a reduced thermal mass cryostat design requires less refrigeration to effect cooldown, the cryostat enjoys the advantages of a quicker operating, faster cooling design requiring less refrigerant. The sensitivity to throttling of a reduced thermal mass sensor can be regulated by the opening or openings placed in the nozzle seat and/or heat exchanger mandrel, i.e. the supporting structure, as previously noted. Since the plastics used for the sensor have a greater heat content on a mass basis than copper or stainless steel which typically form the heat exchanger and its support mandrel, it is important to keep the sensor mass as low as possible.

Placing the sensor toward the colder end of the heat exchanger where it will be cooled and contract the most for a given size allows its mass to be minimized. While the sensor can be placed anywhere along the heat exchanger length as previously described, if it is located in a warmer region it must be made longer, i.e. more massive, if it is to have a similar amount of contraction under similar operating conditions. Reducing the sensor's cross-section normal to its length can reduce the mass gained by increasing its length as long as it does not compromise its mounting strength or shape stability.

Yet another object of the invention is to provide even further throttling sensitivity and control to a cryostat by varying the rate of refrigerant flow and access to the cryostat throttle mechanism. This can be achieved by varying the size of the above-noted refrigerant access ports or openings with a valve mechanism that operates in response to the thermal expansion and contraction of the throttle mechanism.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings.

In the various figures of the drawings, like reference characters designate like parts.

DETAILED DESCRIPTION OF THE PREFERRED EMBODIMENTS

Figure 1:
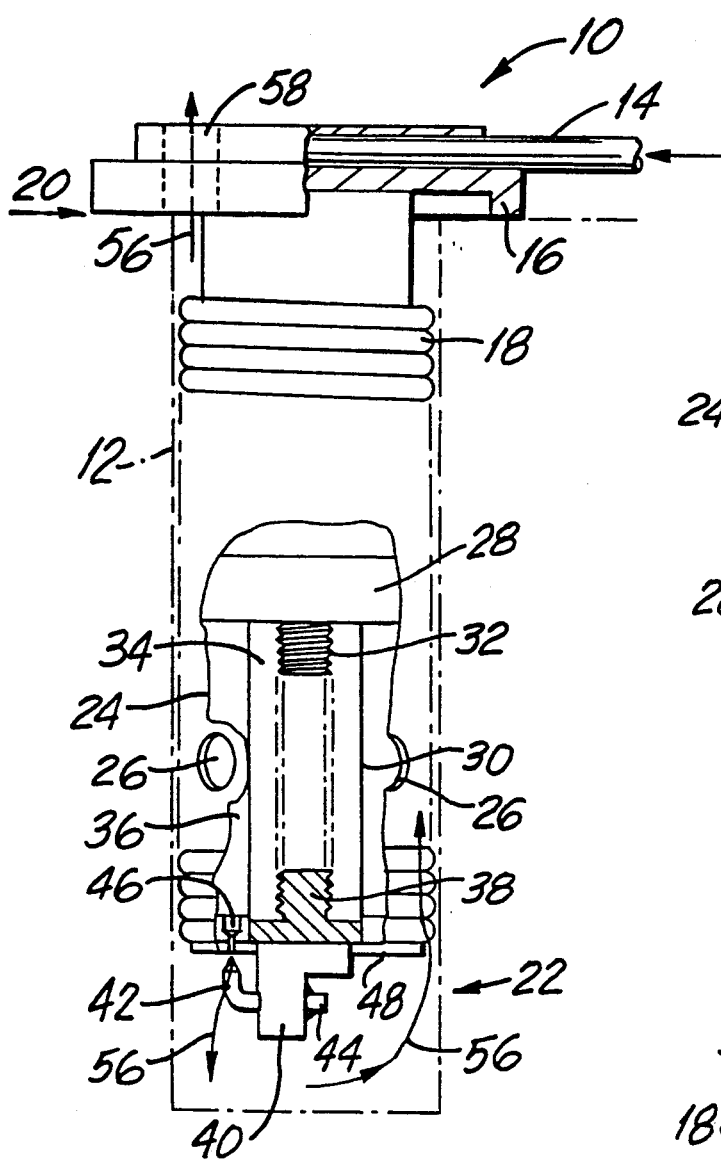
FIG. 1 is a schematic central axial view in partial section of a variable flow cryostat designed in accordance with the invention.

The present invention will now be described in conjunction with the drawings beginning with FIGS. 1 through 4 which depict a variable flow cryostat 10 enclosed in a conventional manner within a dewar flask 12. A refrigerant supply connection 14 extends through an end cap or hermetic closure member 16 to communicate with and direct refrigerant into an inlet to a coiled tube heat exchanger 18.

Figure 4:
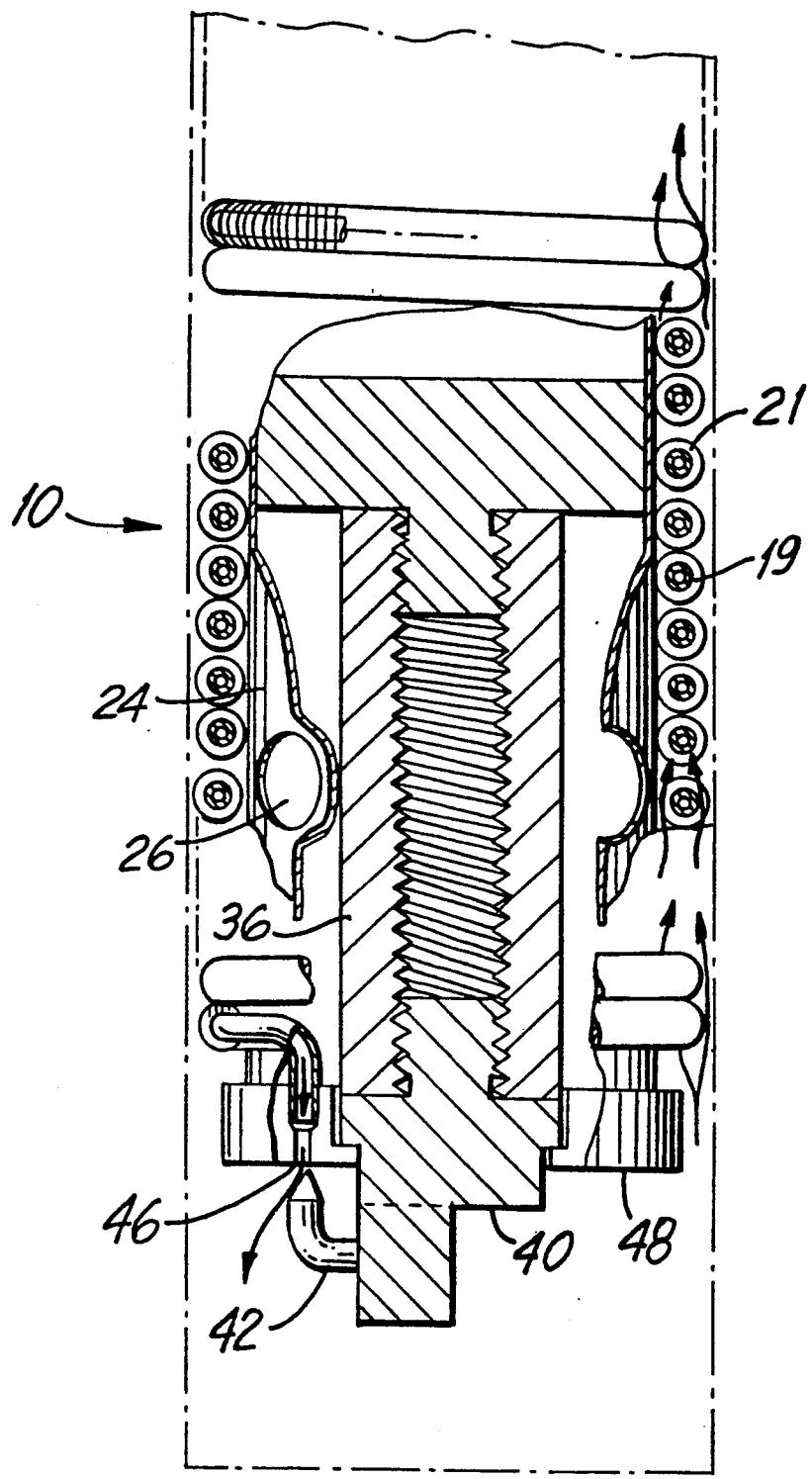
FIG. 4 is another partial enlarged view of FIG. 1 detailing the flow of refrigerant around a finned tube heat exchanger.

As best seen in FIG. 4, heat exchanger 18 includes an inner metal tube 19 surrounded by annular fins 21. The end 20 of the cryostat which receives and supports the refrigerant supply connection 14 is generally referred to as the warm end of the cryostat and the opposite free end 22 is generally referred to as the cold end of the cryostat.

A hollow mandrel or support tube 24 is secured to closure 16 at warm end 20. Support tube 24, which may be formed of a metallic material such as stainless steel, provides a cylindrical support surface about which the heat exchanger 18 is coiled. A significant feature of the invention is the provision of one or more refrigerant access and communication ports 26 formed through the walls of support tube 24. Ports 26, as discussed below, may be varied in size, location and shape to optimize the throttling of refrigerant through the cryostat 10.

Figure 3:
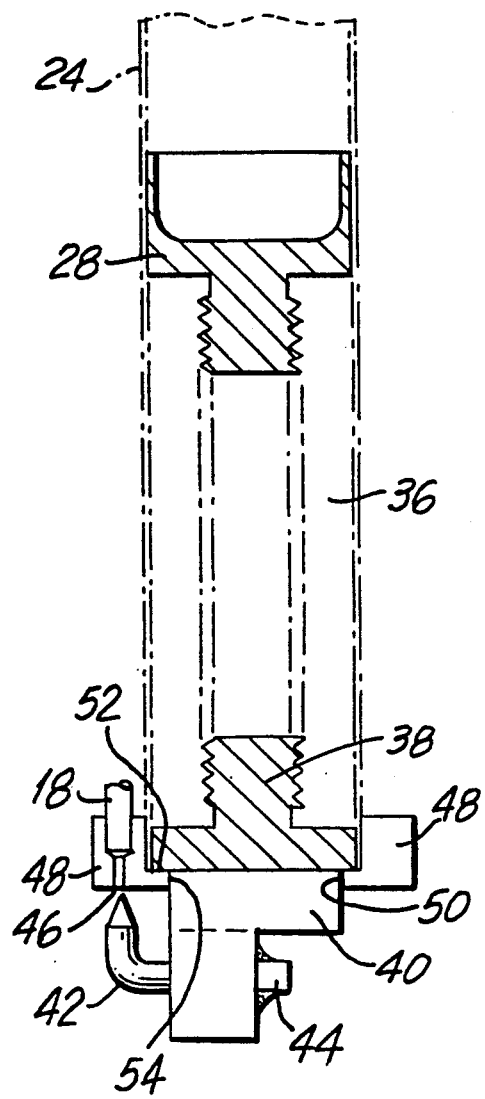
FIG. 3 is a partial enlarged view of FIG. 1 showing details of the mounting structure of the sensor.

As seen in FIG. 3, a mounting piece 28 is secured within the support tube 24 for supporting and concentrically positioning a temperature-sensitive throttle mechanism 30 within the support tube. Mounting piece 28 may be formed of stainless steel and welded by spot-welds to the inner walls of the support tube.

A central threaded portion 32 projects from mounting piece 28 toward the cold end of the cryostat for engaging and supporting the warm end 34 of a tubular plastic sensor 36. Although a threaded connection is shown in the drawings, other fastening methods such as adhesive bonding may instead be used to support the sensor.

Sensor 36 is advantageously formed of a very low hygroscopic plastic material in the shape of a solid billet or hollow tubular sleeve, and functions particularly effectively when formed of polyethylene. A sensor formed of a low hygroscopic material will maintain its design size and most importantly its length, when exposed to varying climates. This dimensional stability has the advantage of providing a more repeatable, reliable and consistent throttling operation. The smaller sensor size permitted by the use of polyethylene is an advantage in this case as it means less sensor surface area is exposed to water absorption.

High density polyethylene is a preferred sensor material as it has a relatively high coefficient of thermal expansion and contraction of $110 \times 10^{-6}/°K$. over a temperature range of 80° K. to 300° K., $64 \times 10^{-6}/°K$. over a temperature range of 80° K. to 180° K. and $50 \times 10^{-6}/°K$. over a temperature range of 80° K. to 130° K. Other suitable sensor materials include high molecular weight polyethylene and ultra high molecular weight polyethylene. Low and medium density polyethylene may also be used. However, it is generally preferred to use a plastic material such as a polyethylene material which has a coefficient of thermal expansion of greater than $110 \times 10^{-6}/°K$. over a temperature range of 300° K. to 80° K.

The plastic sensor 36 may be concentrically mounted within support tube 24 with a clearance fit so that conduction heat transfer between the support tube and the sensor is limited to a path through the mounting piece 28. The radial spacing between the sensor 36 and the heat exchanger mandrel or support tube 24 can be very small, as in FIG. 5 where the sensor outer diameter and mandrel inner diameter are only 0.009 inches apart. In contrast, the space is quite pronounced in FIG. 1.

The mounting piece 28 attached to the warm end of the sensor assembly is close-fit and joined with the heat exchanger mandrel 24 so as to form an annular restriction or seal to prevent exhaust gas from flowing past the mounting piece and bypassing the heat exchanger. The effectiveness of the restriction or seal around the periphery of the mounting piece is not critical when there is an additional warm end joint between the heat exchanger mandrel 24 and the mounting flange or end cap 16.

The cold end of sensor 36 is internally threaded for receiving a valve needle mounting member 40, preferably formed of a metallic material. The mounting member 40 may be formed of copper alloy so as to provide both high mounting strength and high thermal conductivity so as not to impede the temperature sensitivity of the cold end of the plastic sensor.

A metal valve needle 42 is secured to the valve needle mounting member 40 such as by a soldering or welding joint 44. The valve needle 42 is aligned with a valve orifice 46 formed in an annular valve seat element 48. The valve seat element 48, which may be formed of a metallic material, is secured to the cold end of support tube 24 such as by brazing or welding.

General assembly of the cryostat may begin with to the needle mounting member 40 and attaching this to the cold end of the sensor 36. The sensor assembly or temperature controlled throttle mechanism, including the warm end mounting piece 28, the sensor 36 and the needle mounting member 40 is installed into the heat exchanger mandrel or support tube 24 with the needle mounting member 40 positioned against the inside face of the valve seat element 48. Mounting piece 28 may be mounted within and fixed to support tube 24 with a gas tight fit.

Valve seat element 48 is fixed in position by its rigid attachment to support tube 24 thereby forming a supporting structure. The valve needle 42 is then fixed to the valve needle mounting member 40 and is then aligned in a position such that the needle point is centered over the center of the valve orifice 46 and positioned a defined distance away from the orifice. This needle setting or spacing establishes the initial orifice opening, and thus the maximum full flow in the uncooled and unthrottled condition. As the sensor 36 contracts during a subsequent cooldown, it pulls the valve needle point toward the orifice thereby throttling the flow of refrigerant.

As seen in FIG. 3, the valve seat element 48 is formed with a central through hole 50 to allow the valve needle mounting member 40 to freely pass therethrough and to axially reciprocate under thermal expansion and contraction forces generated by the sensor 36. An annular abutment ledge 52 may be formed within the valve seat element 48 for limiting the axial movement of the valve needle. The axially extending walls 54 of through hole 50 radially center the valve needle mounting member 40 with respect to the support tube 24 and thereby radially align the valve needle 42 with the valve orifice 46.

In the position shown in FIGS. 1 and 3, the valve needle 42 is fully actuated by axial thermal expansion of the sensor 36. This valve actuation allows fluid refrigerant to freely issue from the refrigerant supply connection 14, through the interior of the coiled tube heat exchanger 18 and through valve orifice 46. As the refrigerant flows through the valve orifice 46 and collects in the bottom or cold end of the dewar flask 12, the temperature of the cold end 22 of the cryostat begins to decrease. This temperature drop is sensed by the sensor 36 due to it proximity to the refrigerant.

As the temperature of the sensor 36 decreases, the sensor begins to axially contract at a rate much greater than that of the support tube 24. Since the axial length of the support tube 24 determines to a significant extent the axial location of the valve orifice 46, the greater axial contraction of the sensor, and the corresponding axial movement of the valve needle mounting member 40 carried by the sensor, causes the valve needle 42 to approach and enter the relatively fixed valve orifice 46.

Movement of the valve needle 42 into the valve orifice 46 gradually reduces the flow of refrigerant into the dewar flask. As the refrigerant within the dewar flask 12 is subsequently heated by the higher ambient temperature surrounding the dewar flask, the refrigerant is driven toward the warm end of the cryostat as indicated by directional flow arrows 56. An exhaust port 58 is formed through closure 16 to vent the spent refrigerant.

In one particular embodiment, the length of the sensor and the axial spacing of the valve needle from the valve orifice are chosen so that the valve orifice will be open over a temperature range of 240° K. to 100° K. That is, the valve needle 42 will be moved by the sensor 36 so that it is fully seated in the valve orifice 46 provided by the contraction of the sensor beginning at a temperature of about 100° K. and opening fully only when the temperature of the temperature sensor reaches 240° K. After throttling, flow continues through the heat exchanger. A demand flow cryostat, as depicted, typically continues to flow gas through the variable flow nozzle or valve orifice 46.

Throttling usually occurs prior to complete cooldown, but that depends on the design parameters and operating conditions. Cooldown is complete when the refrigerant temperature at the cold end of the cryostat is at its minimum, which depends on the heat exchanger pressure drop due to the flow of refrigerant over it, the exhaust ambient pressure, and the temperature gradient or profile along the heat exchanger. The heat exchanger pressure drop is minimized when the flow has been throttled.

The spacing of the valve needle 42 from the valve orifice 46 may be adjusted and set for a predetermined after-throttle flow rate for a given heat load application. In the case where the plastic sensor can fully contract from only 240° K. ambient, and maintain full contraction below 100° K., the throttling of refrigerant is rendered insensitive to temperature excursions up to 100° K. after an initial cooldown. This contributes to the maintenance of a very stable refrigerant flow as the temperature sensor does not react rapidly to temperature fluctuations or flow fluctuations within this temperature range.

Figure 2:
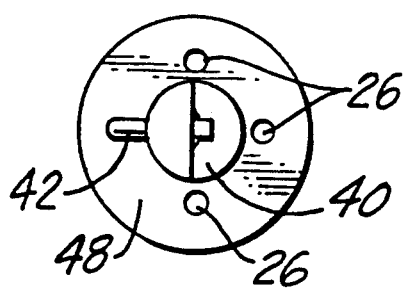
FIG. 2 is a schematic bottom view of FIG. 1 showing a second embodiment with a different or optional location of controlled openings.

As noted above, a particularly advantageous feature of the invention is the provision of one or more refrigerant access ports or openings 26 within the support tube 24. These ports may be positioned and sized to control the reaction time or rate of thermal expansion and contraction of the sensor 36. As seen in FIG. 2, one or more access ports may be formed through the valve seat element 48 in addition to or instead of through the support mandrel 24.

A quicker throttle response is achieved by allowing the refrigerant which has entered the dewar flask from the valve orifice 46 to flow into the interior of the support tube 24. This has the effect of accelerating the contraction of the temperature responsive sensor 36. The refrigerant could be in a gaseous, vaporous or liquid state as it flows through the opening or openings 26 to contact the sensor 36. The important property is the refrigerant's temperature.

In this manner, the throttle sensitivity to different refrigerants may be adjusted to provide for optimum throttle action and control. For example, while FIG. 1 shows several relatively large access ports formed in the side of the support tube 24, FIG. 2 shows an alternate location of several smaller access ports formed through the valve seat element 48. This difference in the size and location of the access ports will effect a different response in the sensor 36 and a corresponding throttling response between the valve needle 42 and valve orifice 46.

Figure 5:
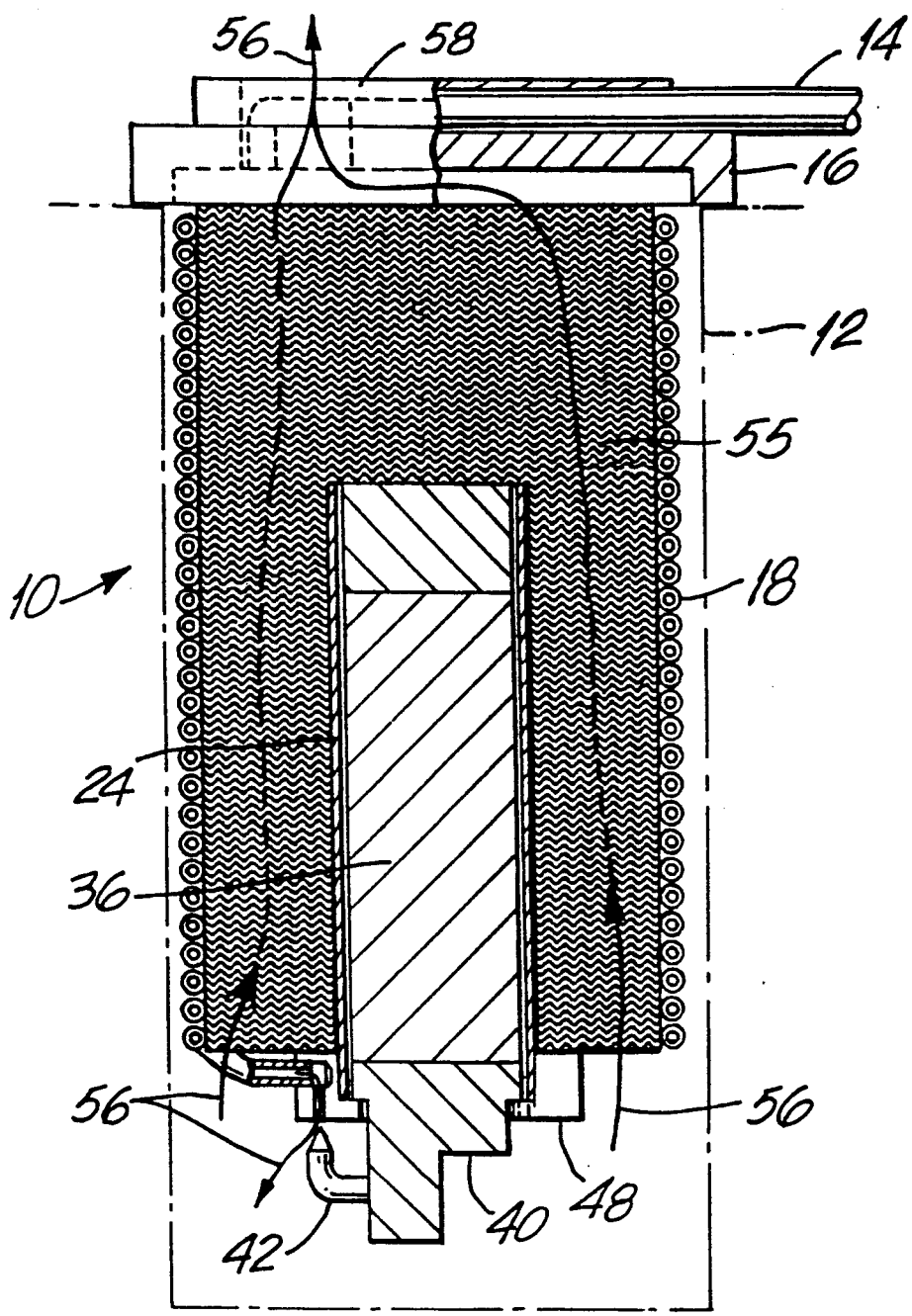
FIG. 5 is a schematic view in axial section of an alternate embodiment of the invention showing the use of a solid sensor in a matrix tube type heat exchanger.

While the sensor 36 of FIGS. 1-4 is shown as a hollow member, it may also be formed as a solid member as shown in FIG. 5. In this embodiment, the heat exchanger is shown as a matrix tube type which includes an interior meshed portion 55 through which the exhausting refrigerant 56 flows. Mounting piece 28 may be fixed to the support mandrel 24 which is nested within the meshed portion 55.

Figure 6:
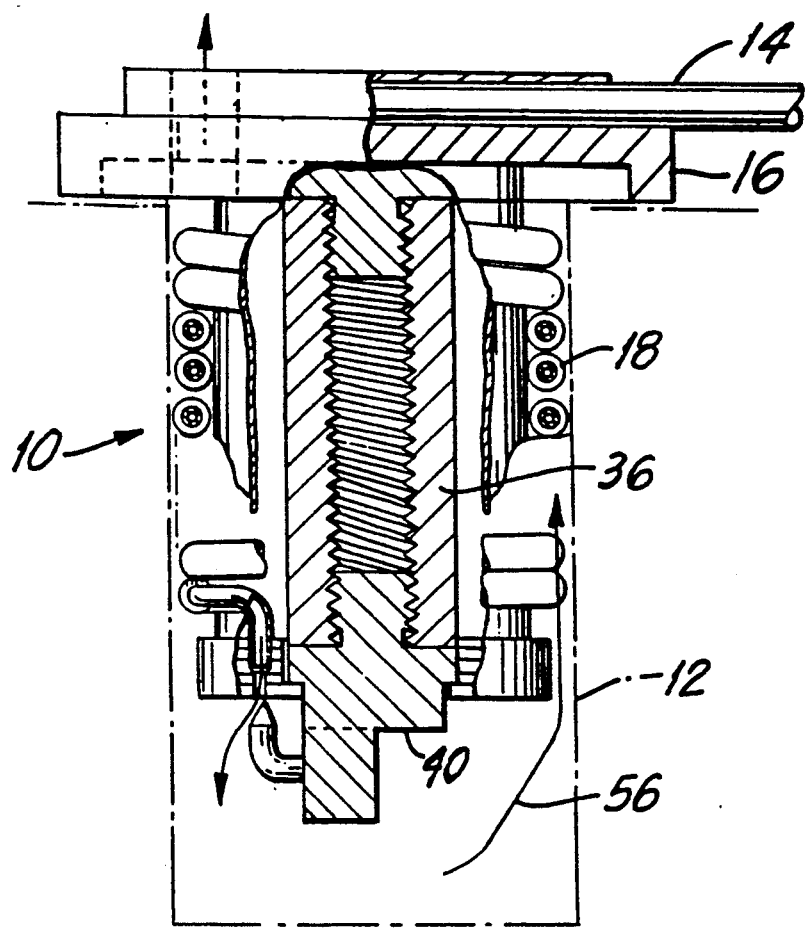
FIG. 6 is a view similar to FIG. 1 showing a throttle sensor which extends axially over the full length of the heat exchanger.

As seen in the embodiment of FIG. 6, the sensor 36 may extend axially along substantially the full length of the heat exchanger mandrel 24. In this case, a separate mounting piece is not required as the sensor 36 may be mounted directly to the closure member 16.

The arrangement of FIG. 6 is particularly effective where a very short length demand flow cryostat is required. With this full length design, the minimum heat exchanger length could be as little as 0.50 inch, which is believed to be axially shorter than any known demand flow cryostat. This design could be applied to longer heat exchangers, except that an increase in length would increase the thermal mass of the sensor 36.

Figure 7:
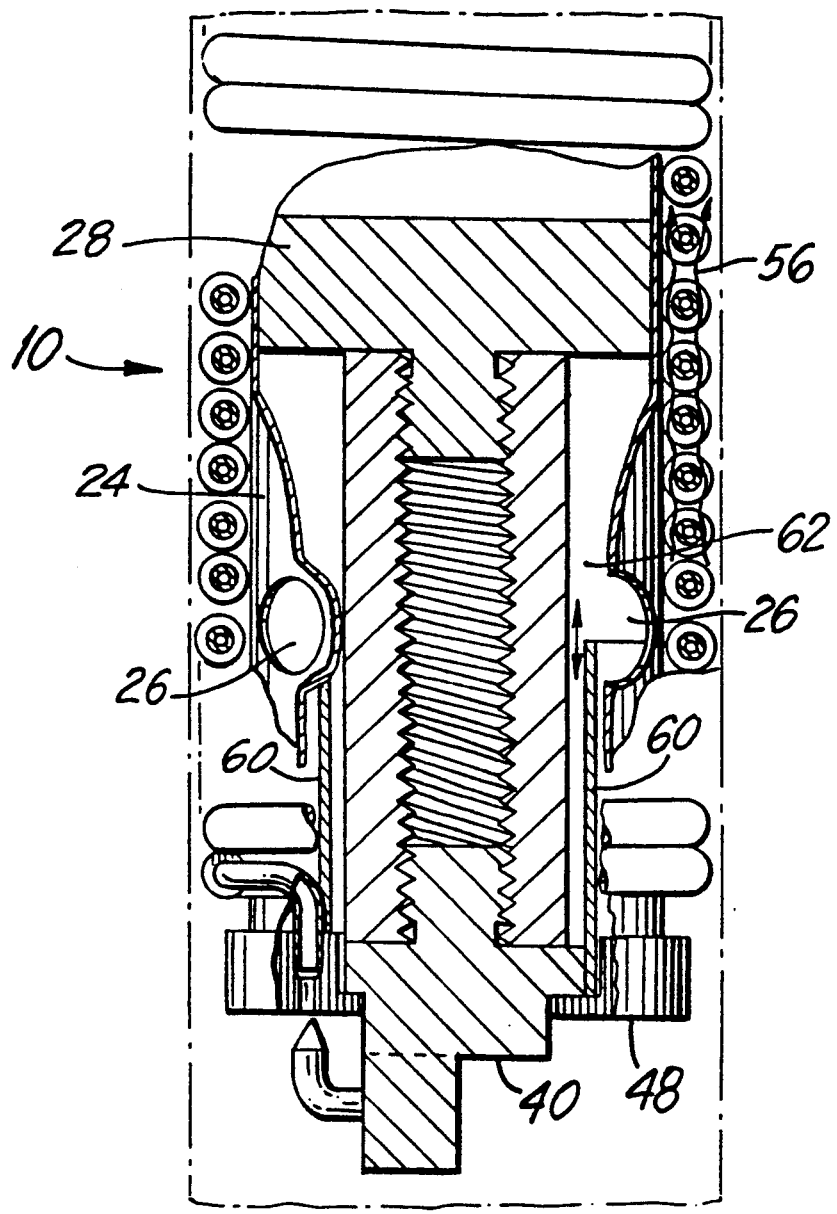
FIG. 7 is a view similar to FIG. 1 showing the addition of a movable shutter to the throttle mechanism.

If the opening or openings 26 are of a size and arrangement such that one of the dimensions of the opening or openings is less than or equal to the length of expansion or contraction of the sensor 36, then the sensor can move a shutter-like element to vary the size, i.e. the open area, of the opening or openings. Such an arrangement is shown in FIG. 7 wherein a movable shutter member 60 is shown attached to the valve needle mounting member 40 for movement therewith. Shutter member 60 may take the form of a cylindrical tube which slides against the inner wall of the support mandrel 24.

Alternatively, the shutter member could be in the form of an apertured surface which is movably aligned with the openings 26 for allowing selective access of the refrigerant to the internal chamber 62 and the sensor 36 disposed therein. It is also possible to vary openings to chamber 62 through valve seat 48 through the use of gate valves, poppet valves, spool valves and needle valves.

Figure 8:
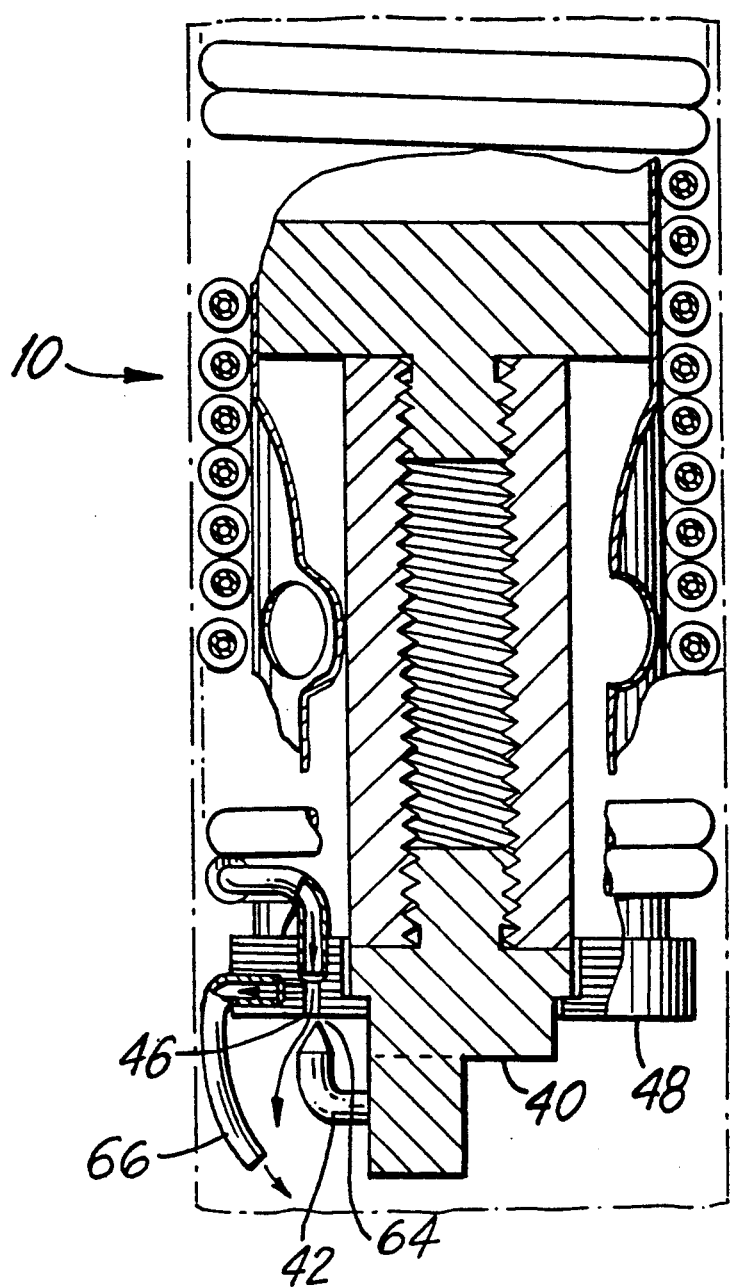
FIG. 8 is a view similar to FIG. 1 showing a dual orifice valve seat.

The present invention may be adapted for use in a dual orifice cryostat such as disclosed in U.S. Pat. No. 4,237,699. In this case, refrigerant continues to flow through a fixed flow nozzle after the complete closure of a variable flow nozzle. Such a dual orifice arrangement is shown in FIG. 8, wherein the cryostat 10 contains both a variable flow nozzle 46 and a fixed flow nozzle 66. Both nozzles are initially open during cooldown. The throttle control mechanism closes the variable flow nozzle 46 thereby reducing the total flow rate, while a reduced flow continues through the fixed flow nozzle 66.

In each application the cryostat must cool down a dewar having a given amount of thermal mass and heat loss. If the desired performance of a cryostat is to cool down a given dewar and heat load as quickly as possible, then the flow rate must be higher and the throttle delay must be longer than for an application not requiring as fast of a cool down. The sensor length, the initial full-open needle position outside of the orifice, and the controlled openings must be combined and coordinated to provide the necessary throttle delay.

A typical sensor length used to date has been 0.32 inch with the needle setting spaced at 0.0055 inch from the orifice. The openings have ranged from none to four 0.032 inch diameter holes in the valve seat. The actual sizes are simply a function of scale which can be varied depending on the heat exchanger length and width or diameter, and the operating temperature range, i.e. the range between the ambient temperature and the refrigerant normal boiling point temperature, over the length of the sensor at its fixed position.

If the desired performance of a cryostat is to cool down at an unimportant rate, but then regulate the afterthrottle flow rate to a desired amount so as to maintain the dewar at a cold temperature while minimizing gas consumption, then an entirely different sensor length, location in the heat exchanger, needle setting and controlled opening arrangement would result. Because of the large number of possible applications, a tabulated set of limits for the sensor length and needle setting is not practical.

There has been disclosed heretofore the best embodiment of the invention presently contemplated. However, it is to be understood that various changes and modifications may be made thereto without departing from the spirit of the invention.

What is claimed is:

1. A cryostat, comprising:
   refrigerant inlet means;
   heat exchanger means for receiving refrigerant from said refrigerant inlet means;
   support means for supporting said heat exchanger on said cryostat;
   a throttle mechanism mounted within said support means;
   valve means including a valve closure means mechanism connected to said throttle mechanism for throttling said refrigerant from said heat exchanger means and seat valve means for throttling said refrigerant from said heat exchanger means, said valve closure means cooperating with said valve seat means; and
   at least one access port formed through said support means for allowing said refrigerant throttled through said valve means to flow through said access port and access said throttle mechanism.

2. The cryostat of claim 1, wherein said heat exchanger means comprises a coiled tube heat exchanger.

3. The cryostat of claim 1, wherein said support means comprises a hollow mandrel.

4. The cryostat of claim 1, wherein said throttle mechanism comprises a member formed of a material having a coefficient of thermal contraction of greater than $100 \times 10^{31} 6/°$ K. over a temperature range of 300° K. to 80° K.

5. The cryostat of claim 1, wherein said valve closure means is a valve closure member.

6. The cryostat of claim 1, wherein said valve seat means includes a valve opening formed in said support means for receiving said valve closure member.

7. The cryostat of claim 1, wherein said access port comprises a variable area access port.

8. The cryostat of claim 1, further comprising means for varying the area of said access port.

9. The cryostat of claim 8, wherein said varying means comprises shutter means.

10. The cryostat of claim 9, wherein said shutter means is connected to said valve closure means.

11. A cryostat, comprising:
    refrigerant inlet means;
    heat exchanger means for receiving refrigerant from said refrigerant inlet means;
    support means for supporting said heat exchanger on said cryostat;
    a throttle mechanism comprising a sensor formed of polyethylene and mounted to said support means;
    valve means including a valve closure means connected to said throttle mechanism for throttling said refrigerant from said heat exchanger means and valve seat means connected to said heat exchanger means for throttling said refrigerant from said heat exchanger means, said valve closure means cooperating wit said valve seat means.

12. The cryostat of claim 11, wherein said polyethylene is selected from the group consisting of low density polyethylene, medium density polyethylene or high density polyethylene, high molecular weight polyethylene and ultra high molecular weight polyethylene.

13. The cryostat of claim 11, wherein said polyethylene comprises a coefficient of thermal contraction of greater than $100 \times 10^{31} 6/°$ K. over a temperature range of 300° K. to 80° K.

14. The cryostat of claim 11, further comprising a mounting piece mounted to said support means, said mounting piece being fastened to said support means and suspending said throttle mechanism from said support means.

15. The cryostat of claim 11, further comprising a mounting member fastened to said throttle mechanism, said mounting member mounting said valve closure means to said throttle mechanism.

16. The cryostat of claim 11, wherein said sensor is mounted within said support means with a clearance fit.

17. A method of controlling the throttling of refrigerant through a temperature actuated cryostat valve which comprises a valve actuator mounted within a support member having at least one refrigerant access port formed therein, and wherein said method comprises releasing said refrigerant through said valve and allowing said refrigerant to flow through said access port and onto said valve actuator.

18. The method of claim 17, wherein said access port comprises a variable area access port and wherein said method further comprises varying the flow of said refrigerant through said access port by varying the area of said access port.

19. The method of claim 18, wherein method further comprises providing a shutter member and wherein said area of said access port is varied by moving a shutter member adjacent said access port.

* * * * *